United States Patent
Aschpurwis (10) Patent No.: US 10,875,724 B2
(45) Date of Patent: Dec. 29, 2020

(54) ADJUSTING THE DISTANCE BETWEEN PIECE GOODS TO BE CONVEYED

(71) Applicant: SIEMENS AKTIENGESELLSCHAFT, Munich (DE)

(72) Inventor: Carsten Aschpurwis, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/607,863

(22) PCT Filed: Apr. 5, 2018

(86) PCT No.: PCT/EP2018/058772
§ 371 (c)(1),
(2) Date: Oct. 24, 2019

(87) PCT Pub. No.: WO2018/197179
PCT Pub. Date: Nov. 1, 2018

(65) Prior Publication Data
US 2020/0189859 A1 Jun. 18, 2020

(30) Foreign Application Priority Data

Apr. 24, 2017 (EP) ..................... 17000699

(51) Int. Cl.
*B65G 47/31* (2006.01)
*B65G 37/00* (2006.01)
*B65G 43/08* (2006.01)
*B65G 43/10* (2006.01)
(Continued)

(52) U.S. Cl.
CPC ........... *B65G 47/31* (2013.01); *B65G 37/005* (2013.01); *B65G 43/08* (2013.01); *B65G 43/10* (2013.01); *B65G 13/02* (2013.01); *B65G 15/24* (2013.01); *B65G 2203/0233* (2013.01); *B65G 2203/044* (2013.01)

(58) Field of Classification Search
CPC ........ B65G 47/30; B65G 47/31; B65G 15/24; B65G 43/08; B65G 2203/042; B65G 37/005; B65G 43/10; B65G 2203/0233
USPC ................................. 198/461.1, 461.2, 461.3
See application file for complete search history.

(56) References Cited

U.S. PATENT DOCUMENTS

| 4,469,219 | A | * | 9/1984 | Cosse | B65G 21/14 198/460.2 |
| 4,494,646 | A | * | 1/1985 | Honegger | B65H 31/3081 198/461.1 |
| 5,322,154 | A | | 6/1994 | Lenherr | |

(Continued)

FOREIGN PATENT DOCUMENTS

| EP | 0433231 A1 | 6/1991 |
| EP | 2336735 A1 | 6/2011 |

(Continued)

*Primary Examiner* — James R Bidwell
(74) *Attorney, Agent, or Firm* — Laurence Greenberg; Werner Stemer; Ralph Locher (57) ABSTRACT

A conveying device for conveying piece goods in a conveying direction adjusts distances between the piece goods to be conveyed. The piece goods are subjected to individually determined accelerations in order to adjust the distances to a set or desired distance. A method for adjusting distances between piece goods and a computer program product are also provided.

13 Claims, 5 Drawing Sheets

(51) Int. Cl.
*B65G 15/24* (2006.01)
*B65G 13/02* (2006.01)

(56) References Cited

U.S. PATENT DOCUMENTS

| | | | | |
|---|---|---|---|---|
| 6,341,685 B1 * | 1/2002 | Spatafora | ............... | B65G 21/14 |
| | | | | 198/460.2 |
| 6,763,931 B1 * | 7/2004 | Brehm | ............... | B65G 43/10 |
| | | | | 198/460.1 |
| 7,017,321 B2 * | 3/2006 | Salvoni | ............... | B65B 7/164 |
| | | | | 198/460.1 |
| 7,793,772 B2 * | 9/2010 | Schafer | ............... | B65G 47/261 |
| | | | | 198/460.1 |
| 8,201,681 B2 * | 6/2012 | Schiesser | ............... | B65G 43/08 |
| | | | | 198/460.1 |
| 8,714,342 B2 * | 5/2014 | Halloran | ............... | H01L 21/67173 |
| | | | | 198/460.1 |
| 2002/0079194 A1 * | 6/2002 | Ydoate | ............... | B65G 47/31 |
| | | | | 198/461.1 |
| 2007/0068772 A1 * | 3/2007 | Bahr | ............... | B65G 47/2445 |
| | | | | 198/461.2 |
| 2009/0114508 A1 * | 5/2009 | Hara | ............... | B65G 43/08 |
| | | | | 198/461.1 |
| 2009/0250312 A1 | 10/2009 | Meisinger | | |
| 2010/0101919 A1 | 4/2010 | Itoh et al. | | |
| 2015/0157034 A1 * | 6/2015 | McEntire, Jr. | ............... | B26D 7/088 |
| | | | | 426/335 |

FOREIGN PATENT DOCUMENTS

| | | | | |
|---|---|---|---|---|
| EP | 2522602 A1 | 11/2012 | | |
| EP | 3081513 A1 | 10/2016 | | |
| GB | 1412679 A | 11/1975 | | |
| GB | 1412700 A | 11/1975 | | |
| JP | 56-98155 | * 8/1981 | ............ | B65G 47/52 |
| JP | S5933814 A | 2/1984 | | |
| JP | H0466112 A | 3/1992 | | |
| JP | 4100784 B2 | 6/2008 | | |
| WO | 2015179722 A1 | 11/2015 | | |

* cited by examiner

ADJUSTING THE DISTANCE BETWEEN PIECE GOODS TO BE CONVEYED

BACKGROUND OF THE INVENTION

Field of the Invention

The invention relates to a conveying device for conveying piece goods in a conveying direction with a conveying path. The invention further relates to a method for adjusting distances between piece goods while the piece goods are being conveyed. The invention furthermore relates to a computer program product.

Conveying devices for conveying piece goods, methods for adjusting distances between piece goods while the piece goods are being conveyed and computer program products are generally known. However, known conveying devices and methods for conveying and adjusting distances between piece goods to be conveyed accelerate each of the piece goods identically so that existing distances are lengthened or shortened identically. With the known conveying devices and methods, it is not possible to manipulate distances such that they least correspond to or even exactly match a set distance.

SUMMARY OF THE INVENTION

Therefore, the object consists in the provision of a conveying device and a method and a computer program product, wherein distances between piece goods during the conveyance thereof can be set such that the distances at least correspond to a set distance.

According to the invention, a conveying device for conveying piece goods in a conveying direction with a conveying path is provided, wherein the conveying path comprises an adjusting section comprising a plurality of conveying elements for adjusting a distance between piece goods on the conveying path extending along the conveying direction of the conveying path such that the distance at least corresponds to a prespecified set distance, wherein the conveying device is embodied to set the conveying speeds of each of the conveying elements independently of the other conveying elements. With the method according to the invention for adjusting distances between piece goods while the piece goods are being conveyed, in order to adjust the distance to a set distance, each of the piece goods is subjected to accelerations determined individually for each of the piece goods until the distance between the piece goods at least corresponds to the set distance. According to the invention, the computer program product comprises program code instructions for performing the method according to the invention when the computer program product is executed on a control facility.

The fact that the piece goods are accelerated individually, i.e. their conveying speed is increased or reduced individually, enables the distance between each of the piece goods and the preceding and/or following piece good to be adjusted individually so that no unnecessarily long or impermissibly short distances arise and the piece goods can be transferred in an optimum arrangement to one another to, for example, a sorting device downstream of the conveying device.

The solution according to the invention can be further improved by various embodiments, which are each advantageous per se and can be combined with one another arbitrarily unless specified otherwise. These embodiments and the advantages associated therewith will be discussed below.

For example, the conveying path can comprise a measuring section arranged upstream of the adjusting section, which is configured to determine the piece length of individual piece goods extending along the conveying direction of the conveying path and current distances between consecutive piece goods. To this end, the measuring section can comprise a length sensor, for example an optical sensor, such as a light barrier, that detects piece goods and gaps between these piece goods during the conveyance and generates a measuring signal that can be used to ascertain the piece-good lengths and the current distances. Since piece goods have different piece-good lengths and the current distances can differ from one another, the upstream measuring section increases the accuracy with which the adjusting section adjusts the distance between the piece goods to the set distance.

The conveying device can comprise a control facility, which is embodied to set the speeds of the conveying elements using the determined piece-good length of a selected piece good and the current distance between the selected piece good and a following or preceding piece good individually such that, after the adjusting section, the distance between the selected piece good and the following and/or preceding piece good at least corresponds to the set distance. The control facility can be connected to the length sensor in a measuring-signal-receiving manner and hence actuate the conveying elements of the adjusting section individually for each of the piece goods in order to adjust the distances between the piece goods during the conveyance of the piece goods in a simple manner.

The length of the conveying elements can be shorter than the sum of the maximum permissible conveying length of a piece good that can be conveyed with the conveying device and five times the current or set distance. Conveying elements that are longer than this impair the efficiency of adjustment of the gap and require an unnecessarily large installation space. For example, the length of the conveying elements can be shorter than the sum of the maximum permissible conveying length of a piece good that can still be conveyed with the conveying device and four times, three times or twice the current or set distance. Particularly high efficiency of adjustment is obtained when the length of the conveying elements is within a range lying between the maximum permissible conveying length plus twice the current or set distance and the maximum permissible conveying length. Maximum efficiency of adjustment is obtained when the length of the conveying elements corresponds to the sum of the maximum permissible conveying length and the current or set distance.

In order to enable piece goods of different lengths to be sorted efficiently, selected successive conveying elements can be combined to form conveying-element groups. The more conveying elements there are in a conveying-element group, the longer the maximum permissible conveying length can be. Although the maximum permissible conveying length decreases when the conveying-element group has few conveying elements or even only one conveying element, it is then also possible to arrange short piece goods particularly efficiently with respect one another. The conveying-element groups can, for example, be assembled flexibly by the control facility and adjusted to the determined piece-good lengths of the piece goods in order to enable highly diverse piece goods to be arranged with respect to one another such that the distance between them at least corresponds to the set distance. For each of the piece goods, it is possible for the assembly, and in particular the number, of the combined conveying elements to be adjusted to the piece-good length of this piece good.

The conveying elements can overlap in sections in the conveying direction so that, on the transition from one of the conveying elements to the following conveying element, there is a step, in particular a downward-leading step. The height of the step can be less than 2 cm, less than 1 cm and, for example, 5 mm, 4 mm, 3 mm, 2 mm or even only 1 mm. Such an offset of transport elements enables even contiguously consecutive piece goods to be separated from one another or shifted toward one another along the conveying direction in order to achieve an increasing distance between these piece goods. Furthermore, in the case of already existing gaps, it is possible for a greater acceleration to be achieved over multiple transport elements in order to enable the distance to be changed in a shorter time. For example, the length of the overlapping conveying elements can correspond to the non-overlapped length of the conveying elements.

The conveying elements can comprise a conveying side that rises along the conveying direction, wherein the piece goods lie on the conveying side during the conveyance. The rising conveying side can also be used to create the step for separating directly contiguous piece goods, wherein the overall height of the adjusting section is lower than when the conveying elements only overlap, i.e. are arranged in different and vertically offset planes.

Optionally, it is also possible for the conveying elements with the rising conveying side to overlap along the conveying direction in order to avoid gaps between the conveying elements and also to reduce the absolute length and height of the adjusting section.

The angle with which the conveying side rises can be less than 5°, less than 4°, less than 3°, less than 2° or less than 1° and in particular 0.5°. The length of the individual conveying elements can again be measured along and parallel to the conveying side, wherein the length can be the length of the non-overlapping section of the conveying side in the conveying direction.

At least one of the conveying elements can comprise a conveyor belt or a plurality of successive conveyor belts, wherein all or selected or individual conveyor belts can be driven differently. In order further to reduce the minimum length of the conveying element, the conveying elements can comprise a belt-free roller conveyor or a plurality of consecutive belt-free roller conveyors. Once again all, selected or individual roller conveyors can be actuated and, for example, grouped to form the conveying element in order to adjust the acceleration individually to the difference between the current distance and the set distance and/or the length of the conveying element individually to the length of the piece good.

The distance between two roll axes of consecutive roller conveyors can be shorter than half the minimum permissible conveying length of a piece good that can be conveyed with the conveying device. The shorter the distance between roll axes, the more smoothly the piece good can be conveyed over the roller conveyors.

According to one embodiment of the method, the acceleration can be ascertained based on the piece-good length and the determined distance, in particular individually for each piece good in order to enable each of the piece goods to be positioned relative to the preceding and/or following piece good such that the distance to the preceding and/or following piece good at least corresponds to the set distance.

Furthermore, according to a further embodiment of the method, each of the piece goods can be accelerated multiple times and/or accelerated differently multiple times in order to enable the distance to be selectively adjusted for each of the piece goods even if the distance is very different from the set distance.

If the distance between the piece goods at least corresponds to the set distance, according to a further embodiment of the method, the acceleration can be zero so that the conveying speed of the adjusting section corresponds to the transport speed of the measuring section. Therefore, distances between piece goods are not changed unnecessarily.

In order to enable it to be ensured that the distance between all the measured piece goods at least corresponds to the set distance, the acceleration of the piece goods can be individually adjusted until even the shortest distance at least corresponds to the set distance.

Depending upon their piece-good length, a path can be defined individually for each of the piece goods in which the conveying device conveys the piece good with an individually determined conveying speed in order to enable the distance between the piece good and a preceding and/or following piece good to be adjusted efficiently.

The distance between two successive accelerations can be measured again in order to enable unintentional changes in the position of the piece goods on the conveying device to be detected and corrected.

With the aid of the conveying device according to the invention and the method according to the invention, after the adjustment of the distance, the distance between piece goods can at least correspond to the set distance, wherein, after the adjustment, the distance between the piece goods may differ from the set distance within a tolerance.

The expression 'at least' can also signify that, after the adjustment, the distances exactly match to the set distance. The set distance can be a predetermined set-distance interval.

The piece goods can be any kind of piece goods, for example shipping goods, such as packages etc.

In the case of the positive acceleration of one of the piece goods, its speed is increased in order, for example, to reduce the distance between said piece good and the preceding piece good and/or the distance between said piece good and the following piece good. In the case of the negative acceleration, i.e. slowing down or braking, of one of the piece goods, its speed is reduced in order, for example, to increase the distance between said piece good and the preceding piece good and/or reduce the distance between said piece good and the following piece good.

The computer program product can be provided on a data carrier. If the computer program product is loaded from the data carrier into the control facility in order to control the conveying device, the control facility can execute the computer program product to adjust the distance. Therefore, the data carrier can be installed in the control facility or can be connected thereto. Alternatively, the data carrier can be provided as a retrofit element for existing control facilities. The data carrier can be provided as a USB stick, a diskette, an optical data carrier (CD, DVD, etc.) or as another type of transportable data carrier. Furthermore, the data carrier can be accessible online so that the computer program product is, for example, provided as a download. Furthermore, the computer program product can be operated on a control facility arranged remotely from the conveying device.

BRIEF DESCRIPTION OF THE SEVERAL VIEWS OF THE DRAWING

The above-described properties, features and advantages of this invention and the manner in which these are achieved will become clearer and more plainly comprehensible in conjunction with the following description of exemplary embodiments explained in more detail in conjunction with the drawings, which show.

DESCRIPTION OF THE INVENTION

First, the structure and function of an exemplary embodiment of the conveying device according to the invention is described with reference to the exemplary embodiment in FIG. 1.

Figure 1:
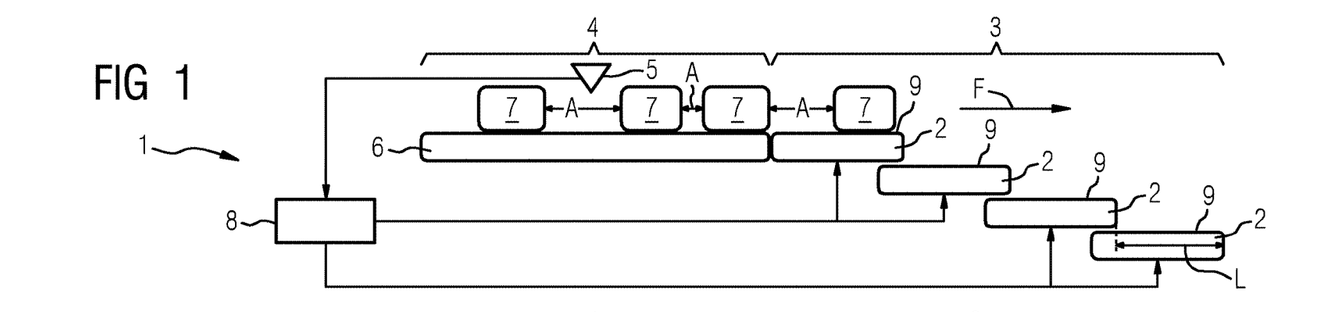
FIGS. 1 to 4 exemplary embodiments of the conveying device according to the invention, FIG. 5 a diagram illustrating the relationship between the efficiency of adjustment of the distance and the length of the conveying elements, FIGS. 6a, 6b an exemplary embodiment of the method according to the invention as a flow diagram and FIG. 7 an exemplary embodiment of the computer program product according to the invention.

FIG. 1 is a schematic side view of the conveying device 1. The conveying device 1 comprises a plurality of conveying elements 2, which together form part of an adjusting section 3 for adjusting piece-good distances of the conveying device 1.

At least one measuring section 4 with a length sensor 5 and a transport element 6 is arranged upstream of the adjusting section 3 in a conveying direction F of the conveying device 1. The transport element 6 can correspond to one of the conveying elements 2 and, for example, comprise at least a transport belt or a plurality of transport rollers. The length sensor 5 is arranged such that it is able to determine the length of piece goods 7 that are to be conveyed with the conveying device 1 and the current distance A between the piece goods 7 along the conveying direction F. The length sensor 5 is an optical sensor and possibly a light barrier, for example.

In order to enable the piece-good length and the current distance A to be determined, the conveying device 1 of the exemplary embodiment in FIG. 1 comprises a control facility 8. The control facility 8 is connected to the length sensor 5 in a length-measuring-signal-transmitting manner. Furthermore, data on the transport speed of the transport element 6 is stored in the control facility 8 so that the length-measurement data and the transport speed data can be used to calculate the piece-good lengths and the current distance A in the control facility 8. The control facility 8 can include a microprocessor and, for example, be a computer, for example a personal computer or a control computer for controlling the conveying device 1.

The control facility 8 can use the ascertained piece-good lengths and distances A to specify the conveying speeds of the conveying elements 2 of the adjusting section 3 such that the conveying elements 2 convey each of the piece goods 7 quickly enough to ensure that, at the latest at the end of the adjusting section 3 lying in the conveying direction F, the current distance A corresponds to a set distance. Herein, the conveying speed of at least one of the conveying elements 2 can differ from other speeds of the other conveying elements 2 and in particular also from the transport speed of the transport element 6 so that the individual piece goods 7 are accelerated differently by the conveying elements 2. The control facility 8 can adjust the conveying speed of each of the conveying elements 2 individually for each of the piece goods 7.

The conveying elements 2 can be arranged along the conveying direction F in a plane and arranged in series.

However, in the exemplary embodiment in FIG. 1, the conveying elements 2 are arranged such that in sections they are arranged in series transverse to the conveying direction F, i.e. overlap in sections in the conveying direction F. However, conveying sides 9 of the conveying elements 2 extend parallel to the conveying direction F and, for example, with a horizontal, i.e. vertical, parallel offset. Therefore, steps, which can also separate contiguous piece goods 7 from one another form between consecutive conveying elements 2 in the conveying direction F.

A length L of the conveying elements 2 is preferably shorter than the sum of the maximum permissible piece-good length of piece goods that can be conveyed with the conveying device 1 and a multiple of the current or set distance. The length L can be the length of the section of the conveying element 2 that is not overlapped by the preceding conveying element 2.

Figure 2:
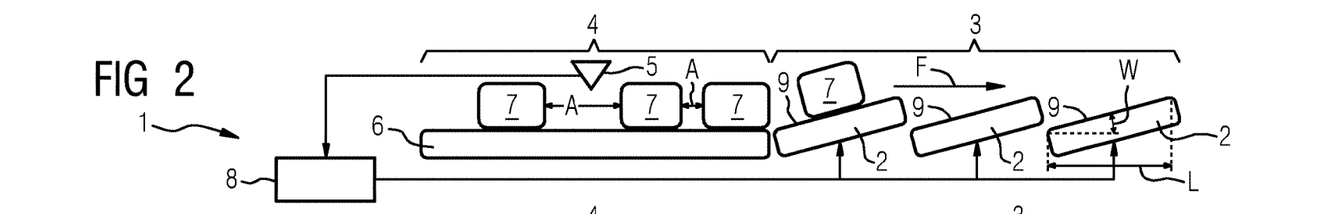

FIG. 2 is a schematic side view of a further exemplary embodiment of the conveying device 1. The same reference characters are used for elements of which the shape and/or function correspond to those of elements of the exemplary embodiment in FIG. 1. For the sake of brevity, hereinafter only the differences from the exemplary embodiment in FIG. 1 will be discussed.

The conveying elements 2 of the exemplary embodiment in FIG. 2 do not overlap in the conveying direction F. However, the conveying sides 9 extend at an angle W, which is greater than 0°, to the conveying direction F and, for example, to the horizontal so that the conveying sides 9 rise in the conveying direction F. This non-overlapping arrangement of the conveying elements 2 with the rising conveying sides 9 again results in the formation of steps for separating contiguous piece goods 7.

Figure 3:
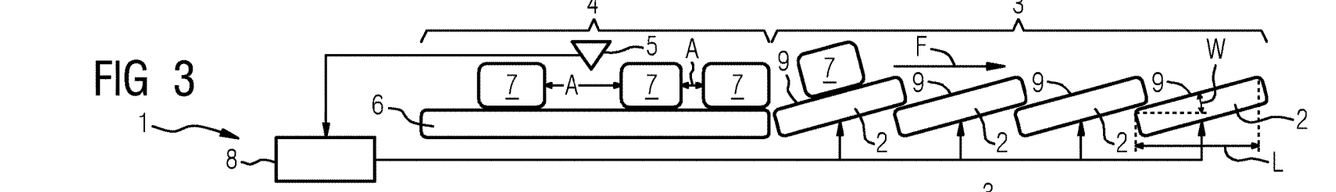

FIG. 3 is a schematic side view of a further exemplary embodiment of the conveying device 1 according to the invention. The same reference characters are used for elements of which the shape and/or function correspond to those of elements of the exemplary embodiment in FIGS. 1 and 2. For the sake of brevity, hereinafter only the differences from the exemplary embodiment in FIGS. 1 and 2 will be discussed.

Like the conveying sides 9 of the exemplary embodiment in FIG. 2, the conveying sides 9 of the exemplary embodiment in FIG. 3 extend at the angle W to the conveying direction F or to the horizontal. However, the conveying elements 2 of the exemplary embodiment in FIG. 3 overlap in the conveying direction F. This staggered arrangement of the conveying elements 2 results in the step for separating contiguous piece goods 7, wherein gaps between the conveying elements 2 are avoided and the overall length of the conveying device 1 is reduced. The length L of the tilted conveying elements 2 corresponds to the length of the section of the conveying sides 9 parallel to the conveying direction F that is not overlapped by the preceding conveying element 2.

In the exemplary embodiments in FIGS. 1 to 3, the conveying elements 2 are depicted as conveyor belts by way of example.

Figure 4:
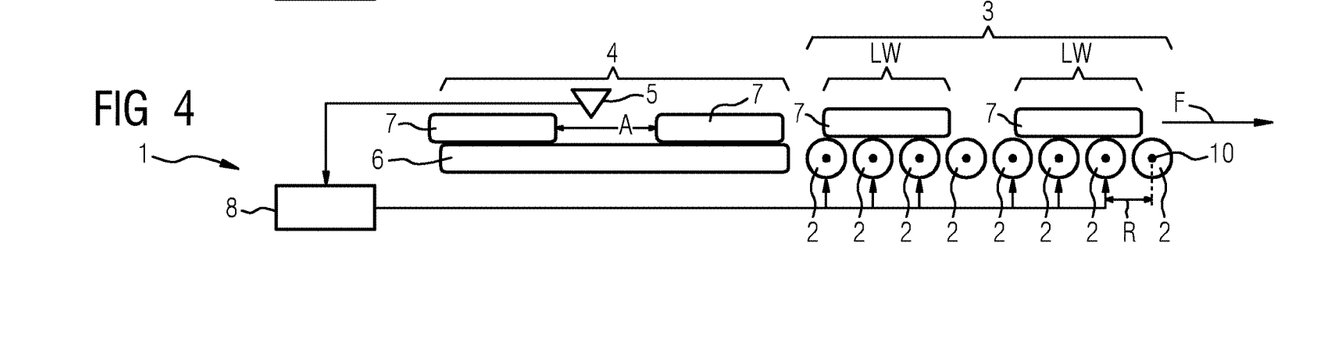

FIG. 4 is a schematic side view of a further exemplary embodiment of the conveying device 1 according to the invention. The same reference characters are used for elements of which the shape and/or function correspond to those of elements of the exemplary embodiment in the previous figures. For the sake of brevity, hereinafter only the differences from the previous exemplary embodiments will be discussed.

The conveying elements 2 in FIG. 4 are depicted by way of example as roller conveyors with central roll axes 10. In particular when the conveying elements 2 are aligned horizontally to one another and arranged in series without overlapping in the conveying direction F, as depicted, for example, in the exemplary embodiment in FIG. 4, it is not only possible for the individual conveying elements 2 to be actuated differently. Rather, the conveying elements 2 can also be combined to form conveying-element groups in order to enable the effective length LW of the conveying-element groups to be adjusted to the piece-good length. Hence, the effective length LW for the piece-good length of every piece good can be adjusted variably in order to enable piece goods with a different piece-good length to be sorted particularly efficiently. Conveyor belts can be combined to form conveying-element groups.

By way of example, the exemplary embodiment in FIG. 4 shows a conveying-element group with three conveying elements 2, which directly follow the transport element 6 in the conveying direction F. This first conveying-element group is followed by an optional non-driven conveying element 2, for example a concurrently running roller conveyor. Further on in the conveying direction F, there follows a further conveying-element group, once again with three conveying elements 2. The number of interconnected conveying elements 2 can be varied in order to change the effective length LW. If a conveying-element group only consists of one individual conveying element 2, the effective length LW corresponds to the conveying element length L.

A roll axis distance R between consecutive conveying elements 2 embodied as roller conveyors is preferably shorter than half the minimum permissible piece-good length of a piece good that can still be conveyed with the conveying device 1 in order to ensure smooth and low-vibration conveyance of the piece good.

Figure 5:
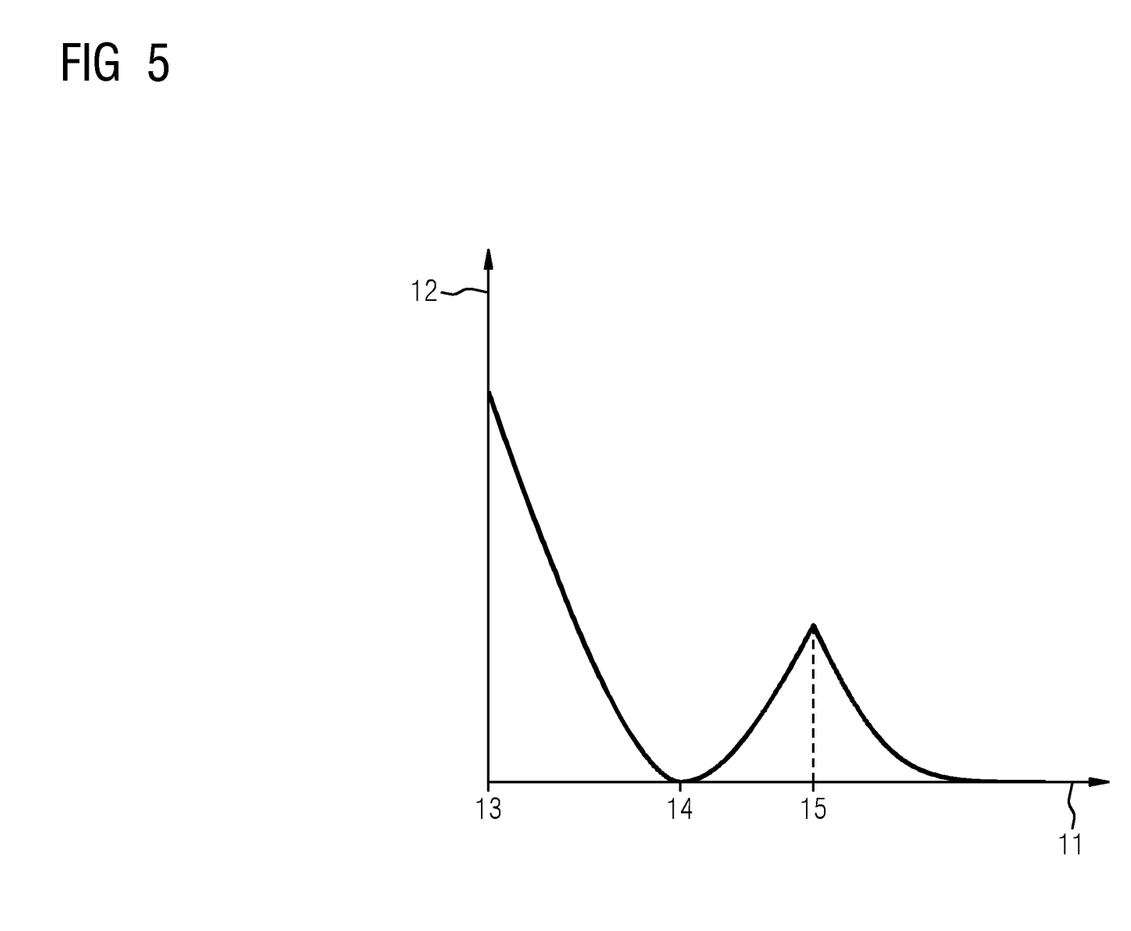

FIG. 5 is a schematic diagram showing by way of example the relationship between the conveying element length L or the effective length LW and the efficiency of adjustment of the adjusting section 3 on the adjustment of the distance A. Herein, the length L or the effective length LW is plotted on the horizontal or X axis 11. The vertical or Y axis 12 represents the efficiency of adjustment. The greater the efficiency of adjustment, the more quickly the distances can be adjusted to the set distance so that the adjusting section 3 can be embodied as short as possible in order to save installation space and so that as many piece goods as possible can be arranged with at least or exactly the set distance between one another in a short time.

In the origin of the coordinate system 13, the length L or the effective length LW is zero. This is the maximum efficiency of adjustment. However, conveying elements 2 without a length L, i.e. without an extension in the conveying direction F, are of a theoretical nature and cannot readily be produced. If there is an increase in the length L or the effective length LW, the efficiency of adjustment falls until it reaches section 14 of the axis 11. In section 14, the efficiency of adjustment is at a minimum, wherein in section 14 the length or the effective length corresponds to the piece-good length. If the length or the effective length increases further, the efficiency of adjustment in section 15 reaches a local maximum after which the efficiency of adjustment falls again. In section 15, the length or the effective length corresponds to the piece-good length plus the current distance measured with the measuring section 4 or plus the set distance.

Figure 6A:
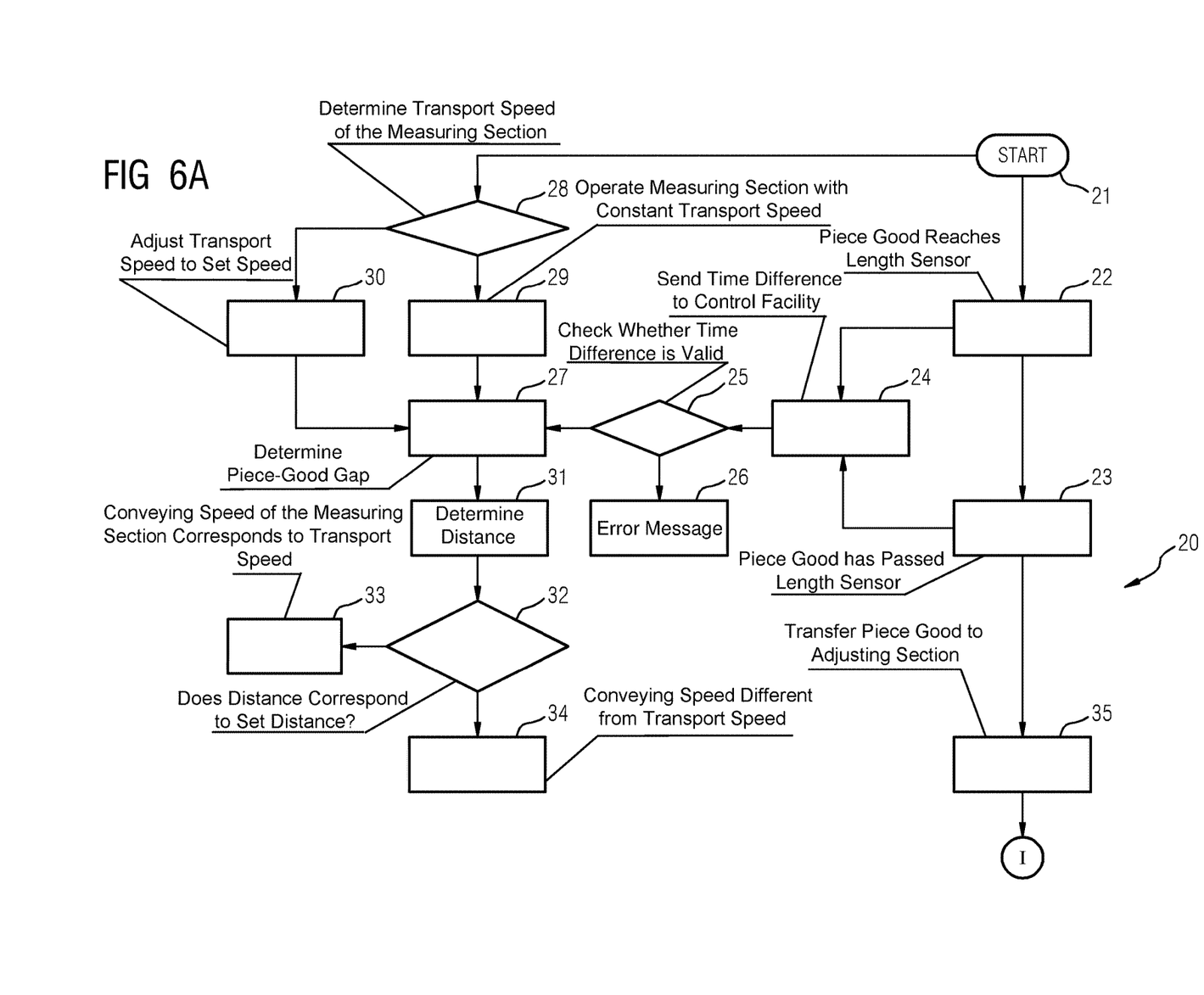
Figure 6B:
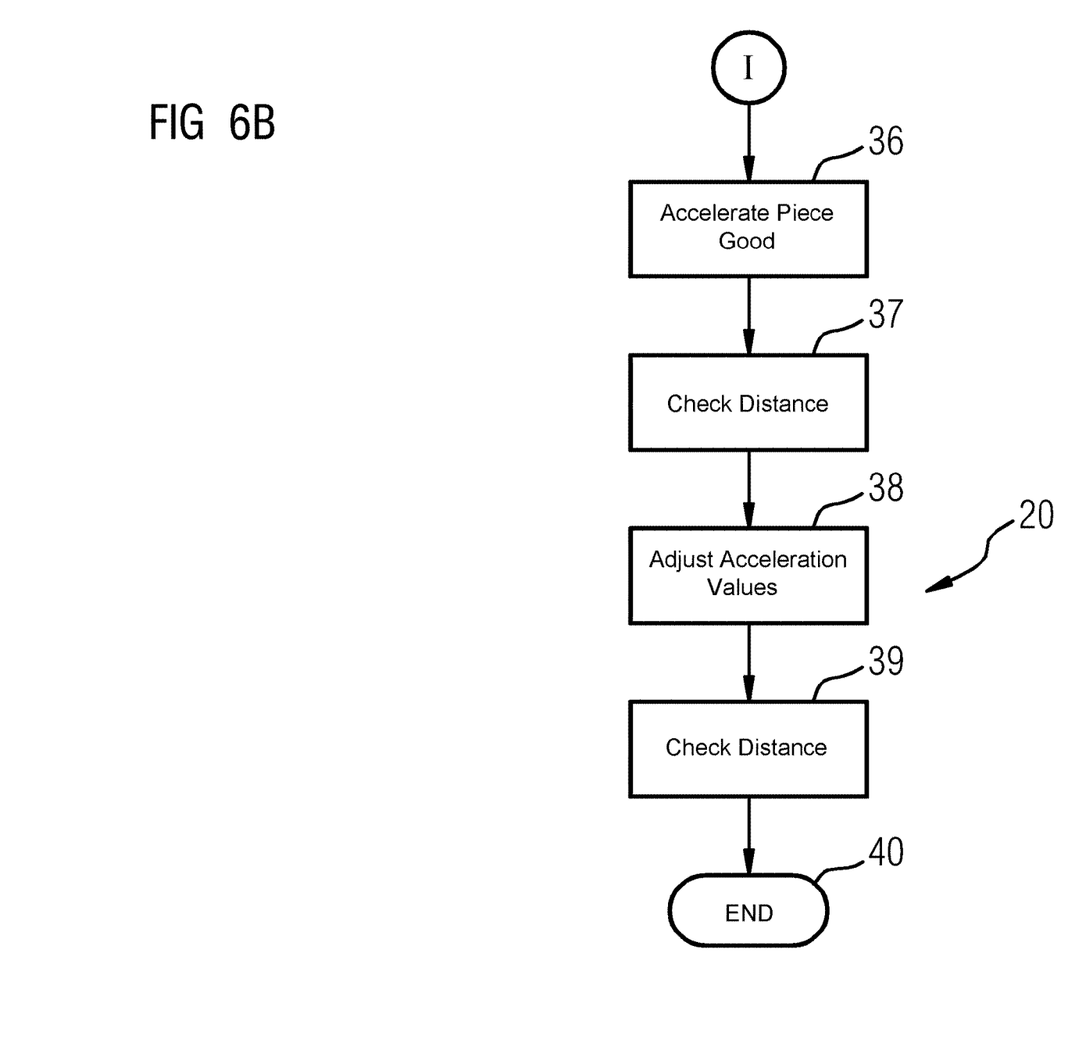

FIGS. 6a and 6b show a very detailed exemplary embodiment of the method according to the invention as a flow diagram. For reasons of clarity, the flow diagram is split into two pages of drawings, wherein the flow-diagram sections are connected to one another via a contact point I.

FIG. 6a shows an exemplary embodiment of the method according to the invention 20 as a flow diagram. The method 20 starts in the method step 21. For example, a piece good 7 reaches the measuring section 4 of the conveying device 1 in the method section 21.

In following method sections 22 to 29, the piece-good length of the piece good 7 is determined. For example, in the method section 22, the piece good 7 reaches the length sensor 5. In the method section 23 following the method section 22, the piece good 7 has already passed the length sensor 5. In the method section 24, the length sensor 5 reports the time difference between the method steps 22 and 23 to the control facility 8. In the method section 25, the control facility 8 ascertains whether the reported time difference is valid, i.e. corresponds to expected values. If the time difference is not valid, the method section 25 is followed by the method section 26 in which the control facility 8 can, for example, output an error message. However, if the time difference is valid, so method step 25 can be followed by the method section 27 in which the control facility 8 determines the piece-good length.

In order to enable the piece-good length to be determined, the transport speed VT of the measuring section 4 should first be ascertained in the method section 28. If the transport speed VT is constant, the method section 29 can be carried out after the method section 28 and before the method section 27 in which the transport element 6 of the measuring section 4 is operated with a constant transport speed VT. If the transport speed VT does not correspond to a prespecified transport speed, first the method section 30 can be carried out after the method section 28 and before the method section 27 in which the transport speed VT is adjusted to the set speed.

After the determination of the piece-good length in the method section 27, it is possible in the method section 31 that now follows for the current distance A to be determined along the conveying direction F between the piece good 7 and the following and/or preceding piece good 7 as was the piece-good length. Herein, the current distance A corresponds to the length of the gap between the two piece goods 7.

The control facility 8 can, for example, use the piece-good length and the current distance A to determine whether a plurality of conveying elements 2 should be combined to form one conveying-element group.

In the method section 32 that now follows, a check is performed as to whether the current distance A between two consecutive piece goods 7 corresponds to a set distance. If the current distance A corresponds to the set distance, the method section 32 is followed by the method section 33, in which, for at least one of the piece goods 7, a conveying speed VF of the adjusting section 3 and at least one or all of the transport elements 6 of the adjusting section 3 is set as equal to the transport speed VT of the measuring section 4. If the current distance A differs from the set distance, the method section 32 is followed by the method section 34 in which the conveying speed VF for at least one of the transport elements 6 and for each of the piece goods 7 is set individually as higher or lower than the transport speed VT.

At the latest after the method sections 33 or 34, the method section 35 can follow in which the piece good 7 is transferred to the adjusting section 3. In the method section 36 that now follows, the piece good 7 is accelerated with individually determined acceleration values at least once or even multiple times by equal or different amounts in order to match the current distance A to the set distance. While the piece good 7 is located on the adjusting section 3, the distance can optionally be checked in the following method section 37. If the checked distance still does not correspond to the set distance, the acceleration values determined for this piece good 7 can be adjusted 38, for example in that the conveying speeds VF of any following conveying elements 2 is set individually for this piece good 7. Finally, in the following method section 39 that now follows, the distance can be checked again.

The method 20 ends in the final method section 40 that follows, wherein in the method section 40 the piece good 7 can be transferred to a sorting device.

Figure 7:
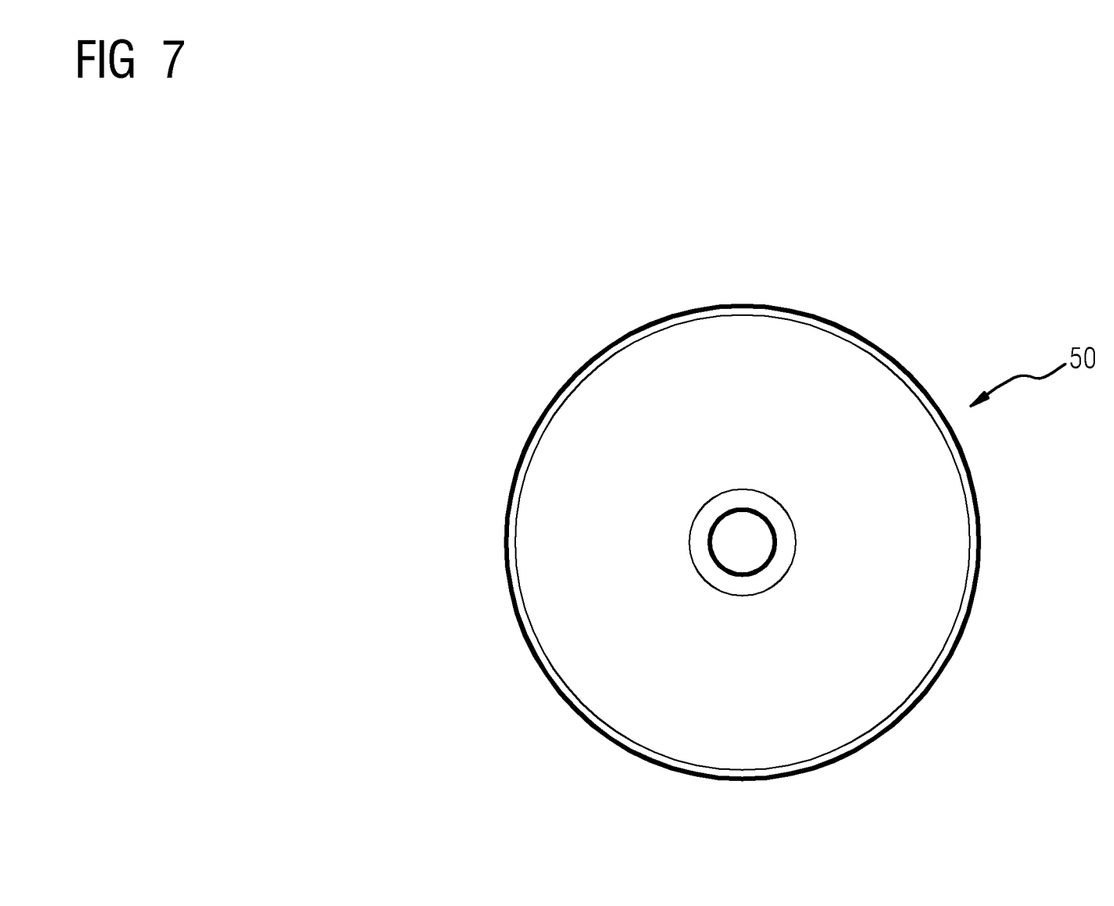

FIG. 7 shows the computer program product 50 according to the invention schematically as a data carrier, for example an optical data carrier.

Although the invention has been illustrated and described in greater detail by preferred exemplary embodiments, the invention is not restricted by the disclosed examples and other variations can be derived herefrom by the person skilled in the art without departing from the scope of protection of the invention.

LIST OF REFERENCE CHARACTERS

1 Conveying device
2 Conveying element
3 Adjusting section
4 Measuring section
5 Length sensor
6 Transport element
7 Piece good
8 Control facility
9 Conveying sides
10 Roll axes
11 X-axis
12 Y-axis
13 Origin of the coordinate system
14 Conveying element length=piece-good length
15 Conveying element length=piece-good length plus distance
20 Method
21 Start
22 Piece good reaches length sensor
23 Piece good has passed length sensor
24 Send time difference to control facility
25 Check whether time difference is valid
26 Error message
27 Determine piece-good gap
28 Determine transport speed of the measuring section
29 Operate measuring section with constant transport speed
30 Adjust transport speed to set speed
31 Determine distance
32 Does distance correspond to set distance?
33 Conveying speed of the measuring section corresponds to transport speed
34 Conveying speed different from transport speed
35 Transfer piece good to adjusting section
36 Accelerate piece good
37 Check distance
38 Adjust acceleration values
39 Check distance
40 End
50 Computer program product
A Current distance
F Conveying direction
L Length of the conveying element
LW Effective length
R Roll axis distance
VF conveying speed of the conveying element
VT transport speed of the measuring section
W Angle

The invention claimed is:

1. A conveying device for conveying piece goods along a conveying path having a conveying direction, the conveying device comprising:
    an adjusting section including a multiplicity of conveying elements for adjusting a distance between the piece goods along the conveying path in the conveying direction causing the distance to at least correspond to a prespecified set distance;
    each of said conveying elements having a conveying speed being set independently of others of said conveying elements in order to adjust the distance; and
    each of said conveying elements including a conveying side rising along the conveying direction.

2. The conveying device according to claim 1, wherein the conveying path includes a measuring section disposed upstream of said adjusting section, said measuring section being configured to determine a piece-goods length of individual piece goods extending in the conveying direction along the conveying path and current distances between consecutive piece goods.

3. The conveying device according to claim 2, which further comprises a controller embodied to individually set the conveying speeds of said conveying elements using the determined piece-goods length of a selected one of the piece goods as well as the current distance between the selected one of the piece goods and at least one of a following or a preceding one of the piece goods, causing the distance between the selected one of the piece goods and the following or preceding one of the piece goods after said adjusting section to at least correspond to the set distance.

4. The conveying device according to claim 1, wherein said conveying elements have a length being shorter than a sum of a maximum permissible conveying length of one of the piece goods to be conveyed and five times said set distance.

5. The conveying device according to claim 4, wherein a plurality of successive conveying elements are combined as a conveying-element group with an identical conveying speed in dependence on the piece-good length to be adjusted of a selected one of the piece goods being disposed at the distance from at least one of a preceding or a following one of the piece goods.

6. The conveying device according to claim 1, wherein said conveying elements overlap in sections in the conveying direction.

7. The conveying device according to claim 1, wherein at least one of said conveying elements includes a conveyor belt or a belt-free roller conveyor.

8. A method for adjusting distances between piece goods while conveying the piece goods, the method comprising the following steps:
    adjusting the distances between the piece goods to a set distance while conveying the piece goods on conveying elements by subjecting each of the piece goods to accelerations determined individually for each of the piece goods until the distance between the piece goods at least corresponds to the set distance;
    providing each of the conveying elements with a conveying side rising along a conveying direction; and individually accelerating the piece goods until even a shortest distance between all of the piece goods at least corresponds to the set distance.

9. The method according to claim 8, which further comprises ascertaining the acceleration based on a piece-goods length and the distance.

10. The method according to claim 8, which further comprises at least one of accelerating each of the piece goods multiple times or accelerating each of the piece goods differently multiple times.

11. The method according to claim 8, which further comprises setting the acceleration to zero when the distance between the piece goods at least corresponds to the set distance.

12. The method according to claim 8, which further comprises defining a path individually for each one of the piece goods in which each one of the piece goods is conveyed with an individually determined conveying speed, depending upon the piece-good length.

13. A non-transitory computer-readable medium with instructions stored thereon, that when executed by a processor, performs the method according to claim 8.

\* \* \* \* \*